Sept. 8, 1931.    R. WEITZEL    1,822,762
METHOD OF MANUFACTURING MOLDED ARTICLES
Filed Feb. 7, 1930

ROBERT WEITZEL
by his attorney
Emil Bonelycke

Patented Sept. 8, 1931

1,822,762

UNITED STATES PATENT OFFICE

ROBERT WEITZEL, OF PARIS, FRANCE

METHOD OF MANUFACTURING MOLDED ARTICLES

Application filed February 7, 1930, Serial No. 426,751, and in France February 22, 1929.

The present invention relates to a method of manufacturing pieces of furniture and other lacquered articles by a simple molding process.

In accordance with the invention, the mold is first coated with a material preventing adhesion of the lacquer, and the mold thus prepared is given one or more coats of a lacquer paint or sizing. Then a relatively thin cloth piece is cemented on, and upon the whole are applied several layers of a cloth coated with a substance adapted to harden in the air, such as plaster, cement or the like. After hardening, the object is removed from the mold, and it then has a smooth outer surface which can receive the final polish.

If the object cannot be molded in one piece, several pieces are produced, and these are joined together by superposing the cloth of one piece upon the edge of the adjacent piece. After the said cloth has become dry, it is lacquered and polished at the exterior by hand.

The accompanying drawings show an example of the method of manufacture in accordance with the invention.

Figure 1:
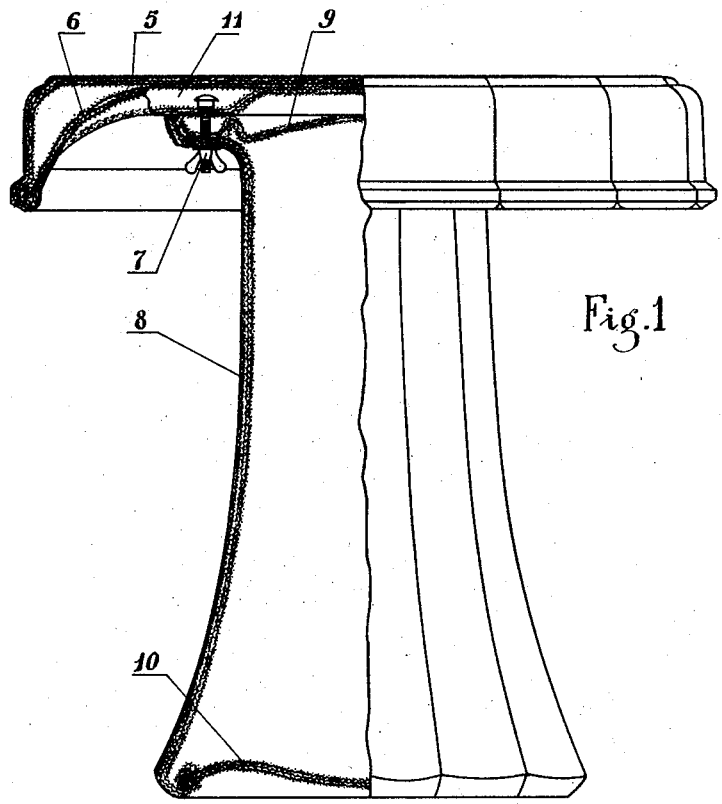
Fig. 1 is a half section of a table which is obtained by the molding of its several parts.

The table shown in Figure 1 includes an upper flat top 5, below which is a strengthening plate 6 to which is secured by bolts 7 a central supporting upright 8 which is closed at the top and bottom by the respective plates 9—10.

According to the invention, in order to obtain any one of these parts, there is employed a mold made in one or two parts and of any suitable material such as plaster or cement and having in hollow relief the form of the part to be molded.

The inner surface of said mold is covered with a layer of lacquer, and then with a layer of a fatty substance or sizing which will dry in a few hours. The lacquer serves to close all the pores of the mold and to facilitate the adhesion of the fatty coating to the said mold. The said fatty substance consists for example of linseed oil (40 per cent), also turpentine, gum, rosin, and a siccative substance.

The surface of the mold thus prepared is carefully rubbed with pumice stone in order to render it as smooth as possible. The final treatment of the mold consists in spreading by means of a pad, a brush, or an air-brush, a very thin layer of a special insulating substance such as silica jelly (finely powdered silica in suspension in a solution of gelatine and glycerin). The silica jelly serves to complete the action of the fatty substance in order to prevent any adhesion to the mold. The said mold is now ready for use.

For the molding of a lacquer object, the operation is as follows:

The operator uses an air brush to dispose in the interior of the mold one or more layers of lacquer paint or composition (paint or coating substance largely composed of acetate of cellulose dissolved in acetone).

When the said layers are dry, he applies a piece of very fine cloth, by means of a layer of cellulose varnish (which requires some care) or preferably by the use of a fatty coating substance consisting largely of linseed oil, benzine and gum.

When the said cloth and said fatty substance have become well dried, he applies several successive layers of cloth coated with a substance which will harden, such as plaster, cement, glue, or the like, and when fully dried, the piece can be removed from the mold, and its outer surface is adapted to receive a definite polish. By using a sufficient number of pieces of cloth, this method affords pieces of a very substantial nature and having about the same specific weight as wood. When the piece, by reason of its size or of the stress to which it is to be subjected, must be very substantial, certain of its parts can be strengthened by folding the cloth upon these parts, thus forming sections having the shape of a T, U or V.

In the particular case shown in the drawings, the strengthening plate 6 of the table is provided with U-shaped ribs 11 which increase the strength of said plate and allow the heads of the bolts 7 to be imbedded during the molding process.

Figure 2:
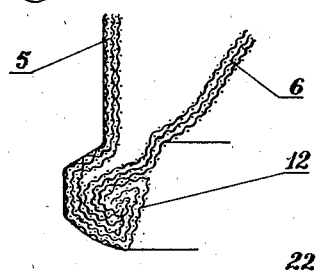
Figs. 2 and 3 show details of the same on a larger scale.
Figure 3:
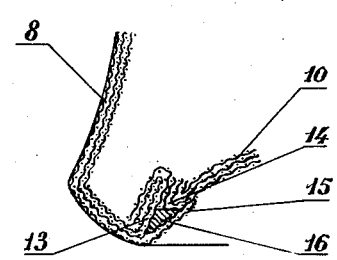

To maintain the strengthening plate 6 in the interior of the plate 5 of the table, care is taken during the molding of the plate to allow the strengthening cloth to extend beyond the edge 12. When the plate 6 is finished, it is removed from the mold and is placed in position, and the operator then folds back the cloth 12 against the lining 6, as shown in Figure 2. When the cloth 12 is dry, he polishes the outer surface of this cloth, and covers it with a coat of lacquer paint similar to the paint used on the outside of the pieces 5—6. This affords an invisible joint of great strength.

If the bottom part 10 is to be attached to the lower end of the upright part 8, he gives to the surface 13 of the inner edge of the said upright part 8 a tapered form, and to the surface 14 of the bottom plate 10 a correspondingly tapered shape, leaving one of the pieces of cloth 15 of the edge part 13 on the outside before inserting the bottom plate 10 and when the latter has been put in place, the joint is filled with a cement-like substance which is then covered by the cloth 15, and said cloth is given a coat of the lacquer paint.

The attaching of the table top part to the upright part 8 by the bolts 7 offers no particular difficulty.

Figure 4:
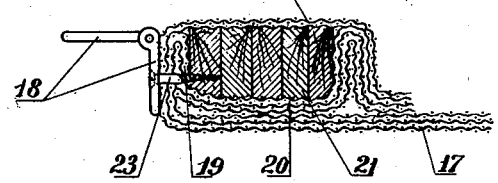
Fig. 4 shows a method of securing a hinge to a piece of furniture.

If any suitable fittings are to be screwed to a piece of furniture, as for instance a hinge, this can be preferably effected by means of the device shown in Figure 4. A flange 19 is formed on the member 17 by the use of certain of the cloth pieces, and at the proper places are disposed cloth pieces 20 made up in the shape of a shallow U or concave piece, which is then filled with plates of wood, fibre or metal 21. The other cloth parts of the member 17 are cemented at 22 to the said plates 21, and the whole is lacquered and polished on the outside. The screws 23 of the hinge 18 are engaged, as shown in the figure, in the plates 21.

The said reinforcing device used for metal fittings may also be employed for any part which is to operate in a special manner.

Between the said plates 21 may be inserted sheets of rubber or like substance by which the whole will be made elastic.

The great advantage offered by the process according to the invention consists in the fact that it affords, by the use of lacquer material, various articles now made of plaster or cement upon which a well finished surface can be obtained only with difficulty and by expensive means, such as successive treatment with pumice stone, in which much labor is expended.

According to the invention, when the articles are removed from the mold, they have a fine surface consisting of a material of such nature that only one pumice stone polishing is required to obtain the finished surface. On the other hand, if it should be necessary to put on other coats of lacquer, these will form an integral part of the lacquer constituting the surface of the article removed from the mold, as any subsequent coats will be of the same nature and can thus slightly dissolve the layer already in place, hence making an intimate connection.

It should be noted that the cloth used to strengthen the lacquer constitutes an interesting application of the method of strengthening now employed in the metal stamping industry.

On the other hand, as the cloth is impregnated with substances which harden at a comparatively slow rate, the assembled parts can be entirely connected upon their whole surface in a much better manner than in the case in which metal parts are assembled by bolts or rivets.

In certain cases, when the surface of the article is to be decorated, it is preferable to place in the mold a sheet of metal, for instance tinfoil, to avoid pumice stone treatment of these parts which are decorated in the mold.

In some cases, the first two steps of the aforesaid process can be reversed, and herein the mold is first coated with a partly fatty substance largely composed of linseed oil, benzine and gum, and the cloth is then made to adhere by means of a layer of lacquer varnish or the like.

In the process according to the invention, objects which are partly transparent can be obtained by placing in the mold which has been thus prepared, suitable cellulose cements, then placing upon the latter one or more layers of a translucent fabric.

It is also feasible to dispose translucent elements such as glass in the form of beads or strips, tortois shell, celluloid, or the like, between the said sheets in order to obtain attractive decorative effects.

The invention is applicable to the manufacture of objects such as furniture, lighting fixtures, art objects, facings, cabins for boats or railroad cars, and it can be further used for the manufacture of trunks, traveling articles, vehicle bodies, telephone cabins, and the like. All such articles will have a sharp external surface, even if this surface has the most complicated forms. Such results could not be obtained with wood, and on the other hand, the articles made according to the invention are quite weatherproof.

I claim:

1. A method of molding pieces of furniture or other articles, which comprises coating the mold with a substance preventing adhesion and then with several coats of lacquer paint or sizing, covering the laquer with a layer of thin cloth, and then covering the whole with several layers of cloth coated with a product adapted to harden in the air.

2. A method of molding a plurality of portions of an article of furniture, in accordance with claim 1, which comprises superposing the cloth of one portion of the article upon the edges of the adjacent portion, and after drying said cloth, lacquering and polishing it, at the exterior.

3. A method of molding articles of furniture, which comprises providing the article of furniture with a trough, filling the interior of the trough with wood, and covering the trough with cloth impregnated with a material adapted to harden in the air.

In testimony whereof, I affix my signature.

ROBERT WEITZEL.